(No Model.) 2 Sheets—Sheet 1.

J. M. HOLMES.
FIBER DISINTEGRATING MACHINE.

No. 533,954. Patented Feb. 12, 1895.

Witnesses:
Charles R. Searle
M. F. Boyle

Inventor:
John M. Holmes
by his attorney
Thomas Drew Stetson (No Model.) 2 Sheets—Sheet 2.

J. M. HOLMES.
FIBER DISINTEGRATING MACHINE.

No. 533,954. Patented Feb. 12, 1895.

UNITED STATES PATENT OFFICE.

JOHN M. HOLMES, OF GLENS FALLS, NEW YORK.

FIBER-DISINTEGRATING MACHINE.

SPECIFICATION forming part of Letters Patent No. 533,954, dated February 12, 1895.

Application filed December 11, 1893. Serial No. 493,298. (No model.)

*To all whom it may concern:*

Be it known that I, JOHN M. HOLMES, a citizen of the United States, residing at Glens Falls, Warren county, in the State of New York, have invented a certain new and useful Improvement in Fiber-Disintegrating Machines, of which the following is a specification.

The machine may be used for disintegrating a great variety of fibrous material, but is more especially intended for treating jute. I will describe it as applied to disintegate jute-butts, receiving the material in bales and delivering it in a light and flocculent condition, and receiving and mixing therewith a small proportion of rags reduced to a similarly flocculent condition. The mixture is delivered in a condition ready for subsequent treatment in a rag engine for the production of paper pulp. The chief difficulty is in the treatment of the jute. This material, highly appreciated as a strong and valuable fiber, is imported in the form of bales of uniform length, about four feet, and approximately rectangular in cross-section, about eighteen (18) inches square, which have been formed by treatment in a press under such conditions that the material is aggregated in a dense mass. The fibers are distinct, but so compacted as to adhere together with great force. The usual practice heretofore, of shaking open these bales by blows with sledge-hammers, is laborious, and in consequence of the effect of the dust on the lungs, extremely unhealthy. In the machine invented by me the operation is conducted within a closed case.

The accompanying drawings form a part of this specification and represent what I consider the best means of carrying out the invention.

Figure 1:
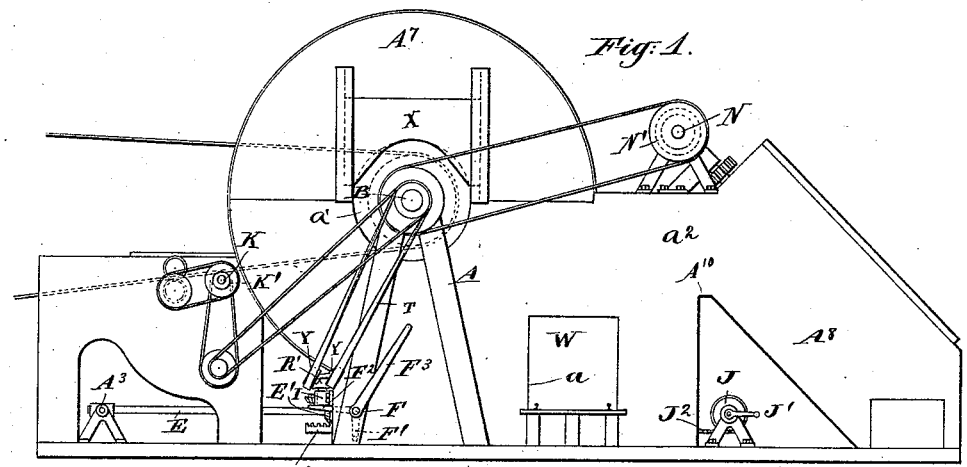
Figure 2:
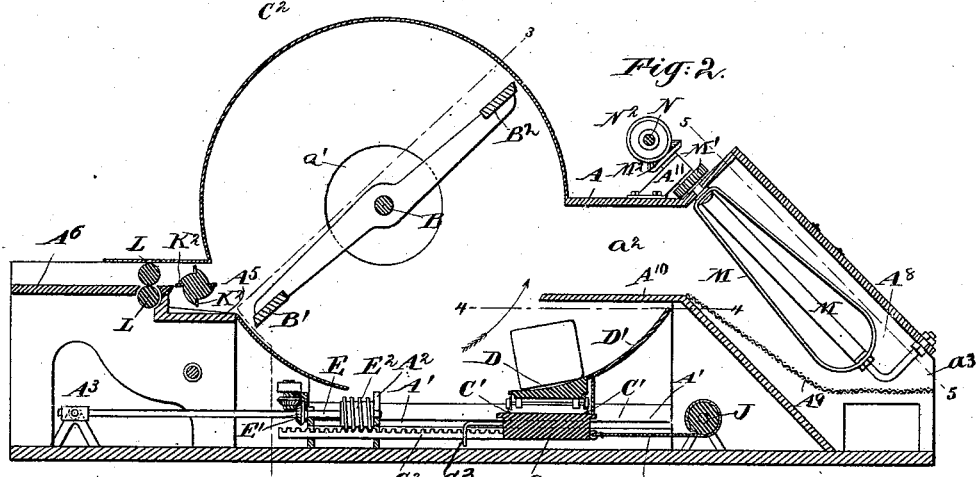
Figures 3, 4, 5:
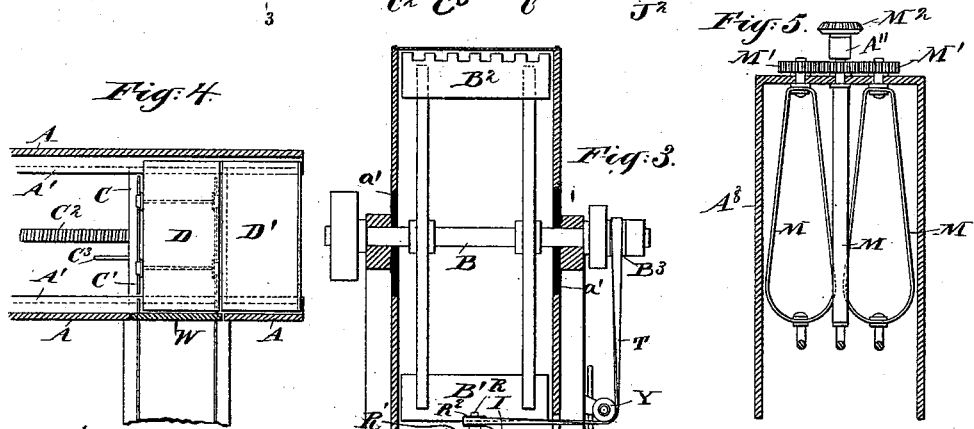
Figure 6:
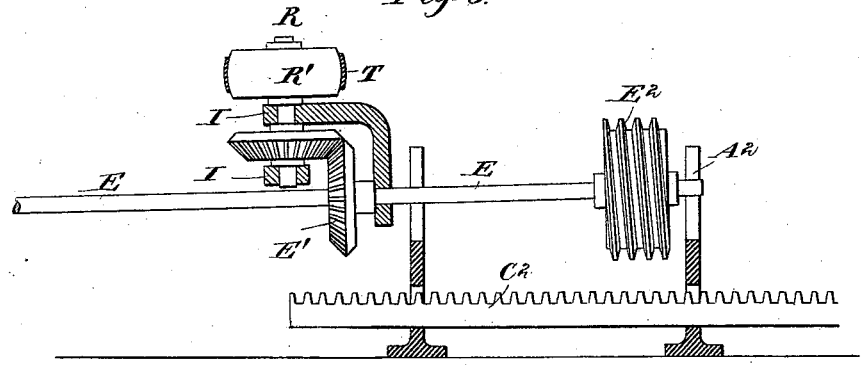
Figure 7:
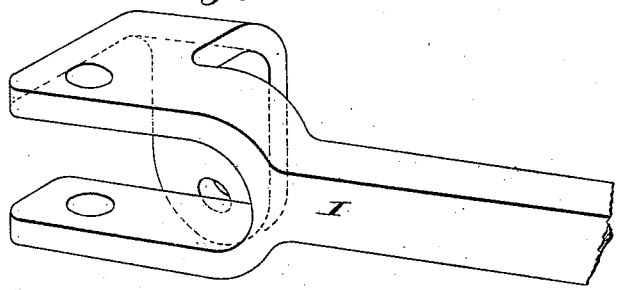

Figure 1 is a side elevation. Fig. 2 is a vertical longitudinal section. Fig. 3 is a transverse section on the line 3—3 in Fig. 2. Fig. 4 is a horizontal section on the line 4—4 in Fig. 2. Fig. 5 is a section on the line 5—5 in Fig. 2. Fig. 6 is an elevation of a portion corresponding to Fig. 2, but on a larger scale, and showing the feed disengaged, and Fig. 7 is a perspective view of a portion.

Similar letters of reference indicate corresponding parts in all the figures where they appear.

In my machine the bales, after the removal of their covering, are introduced laterally, on a slowly traversing horizontal feeder, which moves them into contact in a closed casing with a large rotating beater, having two wings which are unlike in the form of their outer edges, and in their several contacts with the bale, which is gradually fed thereto, they remove and disintegrate successive small quantities of the material. I provide for the free induction of air at the center, and its escape tangentially with the disintegrated fiber. The revolving beaters are so distant one from the other that the current of air moving outward is certain to remove the several particles abraded from the bale from one beater or scraper before the next can come into action, and thus avoid clogging. The cotton or linen rags are fed toward the same beaters by other mechanism at another point. The feeding of each can be controlled as required, so as to vary the proportions indefinitely.

A is the fixed frame-work and casing, certain portions being designated by super-numerals, when necessary.

B is a shaft rotated by a steam engine or other suitable means, and carrying sufficiently stout arms on which are beaters B', B², arranged to counterbalance each other and to act successively on fiber which is slowly presented thereto. The cutting or working edges of the beaters are diverse, one having a straight edge, and the other edge being wavy or toothed, with the obvious effect to act differently on the fiber, one taking away certain portions and the other taking away adjacent fibers which were untouched by the first.

C is a carriage adapted to be traversed longitudinally on rails or ways A', A', and carrying transverse rails C', C', receiving the wheels of a shallow car D, which, when the feeding carriage is in the right position, can be moved in and out through an aperture $a$ in the side of the framing.

C² is a rack fixed to the carriage.

E is a shaft provided with a bevel gear wheel E', and with a worm E², which latter engages with the rack C² when the shaft is in its usual position. The bearing A² of the shaft are open-topped. The bearings A³ at the other end of the shaft is a universal joint.

F is a shaft extending transversely, having an arm F' arranged to be struck and turned near the termination of the forward motion of the carriage C, by an arm C³, mounted on such carriage. Another arm F² on this shaft extends forward, and a third arm F³ on this shaft extends upward. This latter arm is mounted outside of the framing, and serves as a handle to operate by hand when required. The arm F² extends forward under a transverse lever I, which is constructed as shown, having a flat arm extending down one side, (see Fig. 2,) thereby taking hold of the longitudinal shaft E and also embracing by its forked portion (see Fig. 3) a short upright shaft R. There is a bevel gear wheel R' on this upright shaft, which engages with the bevel gear wheel E'. These wheels remain geared together in all positions. A pulley R² on the shaft R receives a belt T which runs around idlers Y properly mounted in the framing, and is impelled by a pulley B³ on the main shaft B. When the carriage has so far moved forward that the bale of material is nearly consumed, it strikes the arm F' and partially turns the shaft. The arm F² now acts against the under side of the transverse lever I which is mounted on a fulcrum A⁴ and adapted to lift both the upright shaft R and the longitudinal shaft E. When the carriage C is so far moved forward that the bale of material is consumed, the action of the carriage through these parts raises the worm E² out of engagement with the rack C². Next the attendant operates a crank J' and turns a windlass J which winds on a chain or cord J² and pulls the carriage C back to the original position. Now the attendant may remove the empty car D and reload it or replace it by another similar one previously loaded, and the operation may be repeated.

The lever I and its attachments should be held up by hand or otherwise during the entire period of return of the carriage C.

W is a door which is capable of sliding up and down in suitable ways, and serves for opening and closing the side aperture $a$ through which the car D is introduced in the loaded condition before each operation and drawn out in the empty or nearly empty condition at the close of each operation.

I provide apertures $a'$ in each side of the main casing A and of the top casing A⁷, which allow the liberal induction of air. Such air, with the partially disintegrated material, is impelled by the action of the beaters, and is driven out fan-wise through a passage $a^2$.

The provisions for introducing rags appear at the left.

A⁵ is a slightly inclined feed-table, and A⁶ another still farther to the left, which is higher and may be level.

K is a revolving shaft rotated by a belt on a pulley K', and carrying wings K², K², which are slightly spiral, to equalize their action.

L L are feed-rolls.

A⁶ is the feed-table on which the attendant places the rags, allowing them to be drawn in slowly by the feed-rolls L, and cut or roughly separated by the wings K², and moved down the table A⁵, and presented to the beaters B', B². The fine material from these rolls should be supplied in the required proportions relatively to the jute and be fed forward by the means before described, the fibers produced by the disintegration of each being mingled, and the mixture being delivered in a light condition.

The rear side of the carriage C is formed with an apron D' curved upward to an extent coinciding with the sweep of the beaters B', B², when the car is in the extreme forward position. It aids to deflect the air and fiber as it is delivered in the latter portion of the treatment of each bale. This serves usefully to guide the air and fiber upward when the machine is used, as it is liable to be, without the employment of the car D, for treating only rags or analogous material introduced through the winged shaft K, K².

It will be observed that if the bale yields and slides under the force received from the beaters it will only move a little distance up the inclined surface D', and then will remain firmly wedged between such surface and the rigid horizontal base of the passage A¹⁰. The slow forward movement of the carriage C does not liberate it but tends to hold it still tighter, and the machine carries it forward thus wedged and presents it to the beater with a definite and uniform movement.

A⁸ is a box or trunk appearing on the right of the machine, and equipped at the bottom with wire-cloth A⁹ of such gage as to arrest the fiber but allow all the dirt and fine dust to fall through. The fiber is delivered from the casing A⁷ which encompasses the beaters B', B², through the passage $a^2$ over the flooring A¹⁰, and into this trunk A⁸, where it is subjected to a further agitation, and the dust is screened out.

M, M, &c., are open-work revolving frames having the forms familiarly known in devices for beating eggs, and similarly geared together, so that in their several revolutions the bar of one beater moves within the path of an adjacent beater. Each is equipped with a spur gear wheel M'. The shaft of one is extended through the supporting frame A'', and is equipped with a bevel gear wheel M², which is engaged by a bevel gear wheel N² on a cross-shaft N, which is rotated at the proper velocity by a belt, running on a pulley N'. The gearing is so proportioned as to give a high velocity to the open-work beaters M and the spur gear M' by which they are connected is so matched that their blades never come in contact. At each revolution the blade of one beater traverses within the hollow interior of another without contact. The device acts very efficiently on the fibers which are moving out through the box A⁸ and insures a very uniform and efficient agitation and separation thereof. The dirt dropped through the screen A⁹ is conducted away by a chute, not represented. The fiber is blown out through the final discharge apertures $a^3$ and may be conducted through any suitable trunk to a bin at a distance, or may be allowed to settle immediately on the floor.

Modifications may be made without departing from the principle or sacrificing the advantages of the invention.

The machine, as already intimated, can be used for treating jute alone, without the mechanism L, K, or it can be used for treating rags alone, without the feeding carriage C and its attachments.

I have shown provisions by pulleys of differing sizes for making the rates of rotation of the several parts hold any required ratio to that of another part. These may be varied indefinitely.

I have shown a sliding gate X on one face of the upper portion $A^7$ of the casing, which can be adjusted up and down by any suitable means so as to vary the size of the central aperture $a'$. I can use a similar device on both sides of the machine. It can be varied in form.

It is only essential that there be convenient means for varying the induction of the air according as the material shall be found to require, so as to insure a fan-like action which shall create a sufficiently strong movement of the air to carry the disentegrated material away from the beaters $B'$, $B^2$, and deliver it through the passage $A^2$ into the box $a^8$.

I can, as already intimated, employ the machine to treat other material than jute received through the aperture $a$. I can introduce through the feed rolls L and the revolving shaft K, other material than cotton and linen. I can introduce successfully through these, fine jute, or jute fabrics, as old coffee bags, and any reasonably softened fibrous material, as the waste from the manufacture of Manila ropes, twine and other cordage. The fibrous material from my machine may be used in other manufactures than paper pulp.

I claim as my invention—

1. In a machine for disentegrating jute and analogous material, a shaft and means for revolving it and a series of beaters carried by said shaft, in combination with a feed carriage and means for giving thereto a definitely prescribed motion in the plane parallel to the plane of rotation of the beaters to move the material slowly and uniformly into the path of the beaters, an inclosing case having openings near the shaft for admitting air, an aperture for discharging the air and disintegrated material, a side aperture for admitting the material and means for opening and closing said side aperture substantially as and for the purpose set forth.

2. In a machine for disintegrating jute and analogous material, the shaft B, with means for revolving it, beaters $B'$, $B^2$, carried by said shaft, one being toothed or waved so as to remove the material in short and partially disintegrated fragments, in combination with the feed carriage C, and means for giving thereto a definitely prescribed motion in the plane parallel to the plane of rotation of the beaters to move the material slowly and uniformly into the path of such beaters, and with the inclosing casing A, $A^7$, having openings near the shaft for admitting air, an aperture for discharging the air and disintegrated material, a side aperture for admitting the material, and means for opening and closing said side aperture, substantially as herein specified.

3. In a machine for disintegrating jute and analogous material, the shaft B, with means for revolving it, beaters $B'$, $B^2$, carried by said shaft, one being toothed or waved so as to remove the material in short and partially disintegrated fragments, in combination with the feed carriage C worm $E^2$ and rack $C^2$ for moving the material slowly into the path of such beaters, and with the inclosing casing A, $A^7$ having openings near the shaft for admitting air, an aperture for discharging the air and disintegrated material, a side aperture for admitting the material and means for opening and closing said side aperture, and with the winged shaft K and suitable operating means therefor, the feed rolls L and means for rotating them slowly, and the tables $A^5$ and $A^6$, adapted to supply rag material slowly to the action of said beaters, all arranged for joint operation substantially as herein specified.

4. In a machine for treating jute and analogous material, the combination with a beater shaft B, and beaters $B'$, $B^2$, thereon, of the feed carriage C, rack $C^2$ and worm $E^2$ for slowly presenting the material to the action of the beaters, the shaft F having arms $F'$, $F^2$, and the transverse lever I for automatically lifting the worm $E^2$ from its engagement with the rack $C^2$ when the material has been fed forward sufficiently, all substantially as herein specified.

5. In a machine for treating jute and analogous material, the combination with a beater shaft B, and beater $B'$, $B^2$, thereon, a feed-carriage C, and mechanism for operating the latter, and slowly presenting the material to the action of the beaters, of the transversely movable car D, and the aperture $a$ and door W, for introducing and removing it, all substantially as herein specified.

6. In a machine for treating jute and analogous material, the combination with a beater shaft B, beaters $B'$, $B^2$, thereon, and a feed carriage and means for giving thereto a definitely prescribed motion in the plane parallel to the plane of rotation of the beaters to move the material slowly and uniformly into the path of the beaters, of the casing A, $A^7$, having the aperture $a'$ for admitting air and the aperture $a^2$ for discharging air and partially disintegrated material the screen A⁹ for permitting the escape of dust and waste material and the set of open-work beaters M, arranged with their axes longitudinal to the motion of the air, and means for operating said beaters, substantially as described and for the purpose set forth.

In testimony that I claim the invention above set forth I affix my signature in presence of two witnesses.

JOHN M. HOLMES.

Witnesses:
H. A. JOHNSTONE,
M. F. BOYLE.